(12) United States Patent
Bagga et al.

(10) Patent No.: US 10,642,804 B2
(45) Date of Patent: May 5, 2020

(54) DYNAMIC NETWORK DATABASE INTEGRATION SYSTEM

(71) Applicant: BANK OF AMERICA CORPORATION, Charlotte, NC (US)

(72) Inventors: Charanjit S. Bagga, Thousand Oaks, CA (US); Pawan Kumar Shetty, McKinney, TX (US); Abdul Rahim F. Mohammed, Richardson, TX (US); Igor Alksnin, Tarzana, CA (US); Karthikeyan Bimmanaar Velayudhasamy, Simi Valley, CA (US); Matthew David Ngou, Simi Valley, CA (US); Nagesh Mansabdar, Chatsworth, CA (US); Muralidhar Chowdarapu, Simi Valley, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 203 days.

(21) Appl. No.: 16/022,497

(22) Filed: Jun. 28, 2018

(65) Prior Publication Data
US 2020/0004847 A1 Jan. 2, 2020

(51) Int. Cl.
| | |
|---|---|
| G06F 17/00 | (2019.01) |
| G06F 16/21 | (2019.01) |
| G06F 16/25 | (2019.01) |
| G06F 16/951 | (2019.01) |
| G06F 16/2455 | (2019.01) |
| H04L 29/08 | (2006.01) |

(52) U.S. Cl.
CPC ........ *G06F 16/211* (2019.01); *G06F 16/2455* (2019.01); *G06F 16/252* (2019.01); *G06F 16/951* (2019.01); *H04L 67/02* (2013.01); *H04L 67/10* (2013.01)

(58) Field of Classification Search
CPC .. G06F 16/211; G06F 16/2455; G06F 16/951; G06F 16/252; H04L 67/02; H04L 67/10
See application file for complete search history.

(56) References Cited

U.S. PATENT DOCUMENTS

| | | |
|---|---|---|
| 6,065,117 A | 5/2000 | White |
| 6,185,306 B1 | 2/2001 | Mages et al. |

(Continued)

*Primary Examiner* — Tyler J Torgrimson
(74) *Attorney, Agent, or Firm* — Michael A. Springs; Moore & Van Allen PLLC; Vaidehi Bachoti

(57) ABSTRACT

Embodiments of the present invention relate to apparatuses, systems, methods and computer program products for dynamic network database integration. Specifically, the system typically provides dynamic correlation, transformation and combination of data stored at a plurality of database locations. In some aspects, the system receives a retrieval request for retrieving one or more records. The system then typically retrieves, transforms and dynamically integrates unstructured data stored at disparate database locations to construct one or more structured records. The system may also construct the one or more structured records such that the one or more structured records are compatible with the user interface of the user device application API. The system may also be configured to facilitate dynamic modification of the retrieval request, in run-time, using custom HTTP headers.

20 Claims, 7 Drawing Sheets

(56) References Cited

U.S. PATENT DOCUMENTS

| | | | |
|---|---|---|---|
| 7,818,759 B2 * | 10/2010 | Ahmed | H04L 67/10 |
| | | | 719/330 |
| 7,890,659 B2 | 2/2011 | Pasha et al. | |
| 7,934,221 B2 | 4/2011 | Parker et al. | |
| 8,732,200 B2 | 5/2014 | Tootill | |
| 8,799,115 B2 | 8/2014 | Schmitt | |
| 8,959,482 B2 | 2/2015 | Bhogal et al. | |
| 2008/0147834 A1 | 6/2008 | Quinn et al. | |
| 2008/0270459 A1 | 10/2008 | Grewal et al. | |
| 2009/0158302 A1 * | 6/2009 | Nicodemus | G06F 21/577 |
| | | | 719/328 |
| 2010/0057834 A1 | 3/2010 | Macken et al. | |
| 2011/0072027 A1 | 3/2011 | Wu et al. | |
| 2012/0011174 A1 | 1/2012 | Dham et al. | |
| 2013/0031539 A1 | 1/2013 | Liverance | |
| 2014/0244721 A1 | 8/2014 | Taine et al. | |
| 2014/0278724 A1 | 9/2014 | Compagna et al. | |
| 2014/0280494 A1 * | 9/2014 | Samoylenko | H04L 67/10 |
| | | | 709/203 |
| 2014/0344340 A1 * | 11/2014 | Tang | H04L 67/2823 |
| | | | 709/203 |
| 2015/0033335 A1 | 1/2015 | Zhao et al. | |
| 2015/0074236 A1 | 3/2015 | Ulbricht et al. | |
| 2015/0156183 A1 | 6/2015 | Beyer et al. | |
| 2015/0347480 A1 * | 12/2015 | Smart | G06F 16/2264 |
| | | | 707/743 |
| 2016/0226946 A1 | 8/2016 | Karaatanassov et al. | |
| 2016/0308933 A1 * | 10/2016 | Grant | G06F 16/84 |
| 2017/0185904 A1 * | 6/2017 | Padmanabhan | G06F 16/00 |
| 2017/0364534 A1 * | 12/2017 | Zhang | G06F 16/284 |
| 2019/0012381 A1 * | 1/2019 | Debique | G06F 17/30752 |
| 2019/0068616 A1 * | 2/2019 | Woods | G06F 16/9566 |

* cited by examiner ized system, and an associated method and computer program product, for dynamic network database integration. Specifically, the system is configured for dynamic correlation, transformation and combination of data stored at a plurality of database locations. In some embodiments the system comprises a computer apparatus including a memory device with computer-readable program code stored thereon, a communication device is configured to establish operative communication with a plurality of networked devices via a communication network, and a processing device operatively coupled to the memory device and the communication device configured to execute the computer-readable program code.

DYNAMIC NETWORK DATABASE INTEGRATION SYSTEM

FIELD

In general, embodiments of the invention are directed to a system that performs technical processing of unstructured data stored at disparate database storage locations. In particular, the system of the present invention is configured for dynamic correlation, transformation and combination of data stored at a plurality of database locations.

BACKGROUND

With advancements in technology, entities have increasingly embraced a multitude of information technology resources, in an attempt to administer an ever increasing number of operational activities associated with the functioning of the entities. However, processing, storing and analyzing the massive amounts of data associated with the information technology operational activities and the information technology resources using existing systems is challenging, both from technical and feasibility standpoints. Furthermore, existing systems and technology are inept at evaluating and correlating the disparate unstructured data stored at various disparate locations. Thus, there is a need for technical solutions which alleviate the deficiencies of the existing systems and provide novel systems for dynamic correlation, transformation and combination of data stored at a plurality of database locations.

The previous discussion of the background to the invention is provided for illustrative purposes only and is not an acknowledgement or admission that any of the material referred to is or was part of the common general knowledge as at the priority date of the application.

BRIEF SUMMARY

Embodiments of the present invention address the above needs and/or achieve other advantages by providing a computerized system, and an associated method and computer program product, for dynamic network database integration. Specifically, the system is configured for dynamic correlation, transformation and combination of data stored at a plurality of database locations. In some embodiments the system comprises a computer apparatus including a memory device with computer-readable program code stored thereon, a communication device is configured to establish operative communication with a plurality of networked devices via a communication network, and a processing device operatively coupled to the memory device and the communication device configured to execute the computer-readable program code.

In some embodiments, the system is configured for dynamic network database integration. In this regard, the system is configured to: receive, from a user device, a retrieval request for retrieving one or more records, wherein receiving the retrieval request comprises: receiving a plurality of data elements to be integrated for each of the one or more records; and receiving a data element transformation structure for integrating the plurality of data elements. Moreover, the system is configured to: determine that (i) first unstructured data associated with a first data element of the plurality of data elements is stored at a first database location associated with a first application programming interface (API) and (ii) second unstructured data associated with a second data element of the plurality of data elements is stored at a second database location associated with a second API; construct a data schema structured for retrieving the first unstructured data stored at the first database location and the second unstructured data stored at the second database location; retrieve the first unstructured data from the first database location and the second unstructured data from the second database location based on executing the data schema; determine a user API format of a user device application API of the user device, wherein the user device application API is configured to present a user interface on the user device, wherein the first unstructured data and the second unstructured data are not compatible with the user interface of the user device application API. Moreover, the system is configured to: construct one or more structured records associated with the retrieval request, wherein the one or more structured records comprise the plurality of data elements, wherein constructing the one or more structured records comprises transforming the first unstructured data and the second unstructured data into structured data such that at least (i) the one or more structured records comprise the data element transformation structure and (ii) the one or more structured records are associated with the user API format such that the one or more structured records are compatible with the user interface of the user device application API; and initiate, via the user device, a presentation of the one or more structured records on the user interface of the user device application API.

In some embodiments, or in combination with the previous embodiment, the system is configured to: receive, from the user device, a modification request at a time following the retrieval request and following the construction of the data schema, wherein the modification request comprises a modification to at least one of the plurality of data elements and the data element transformation structure of the retrieval request; and in response to the modification request, construct a custom Hypertext Transfer Protocol (HTTP) header structured for dynamically abstracting the presentation of the one or more structured records on the user interface based on the modification request. Moreover, the custom HTTP header is structured for: preventing the presentation of the one or more structured records on the user interface; and initiating a presentation of dynamically modified structured records, wherein the dynamically modified structured records comprise the one or more structured records modified based on the modification request.

In some embodiments, or in combination with any of the previous embodiments, in response to the modification request, the system is configured to identify that the one or more structured records are being currently presented on the user interface. Here, preventing the presentation of the one or more structured records on the user interface further comprises blocking functionality of the presentation of the one or more structured records on the user interface. Moreover, in some instances, initiating the presentation of the dynamically modified structured records comprises overlaying the presentation of the dynamically modified structured records on the user interface over the presentation of the one or more structured records having blocked functionality.

In some embodiments, or in combination with any of the previous embodiments, in response to the modification request, the system is configured to identify that the one or more structured records are being currently presented on the user interface. Here, preventing the presentation of the one or more structured records on the user interface further comprises revoking the presentation of the one or more structured records on the user interface.

In some embodiments, or in combination with any of the previous embodiments, the system is configured to: store the constructed one or more structured records associated with the retrieval request in a first temporary memory location; and in response to the modification request, dynamically modify at run time, via the custom HTTP header, the one or more structured records stored at the first temporary memory location based on the modification request, without constructing a modified data schema.

In some embodiments, or in combination with any of the previous embodiments, the system is configured to determine a logical relationship between the first data element and the second data element based on analyzing the first data element and the second data element, wherein the logical relationship comprises a parent object comprising the first data element and a child object comprising the second data element. Here, constructing the one or more structured records associated with the retrieval request typically comprises: constructing a logical data model based on the determined logical relationship; and transforming the first unstructured data and the second unstructured data based on the logical model.

In some embodiments, or in combination with any of the previous embodiments, initiating the presentation of the one or more structured records on the user interface further comprises: presenting, for each record of the one or more structured records, an abstracted view comprising a selectable graphical element associated with the first data element, wherein the selectable graphical element is structured such that selection of the selectable graphical element at the user device is configured to trigger the presentation of the second data element.

In some embodiments, or in combination with any of the previous embodiments, the first API is a Microservices API associated with the first data element and the system is configured to: determine that storage address of the first unstructured data has changed from the first database location to a third database location; and update the first API such that the third database location is a source for the first API such that the data schema is structured for retrieving the first unstructured data stored at the third database location without modifying the data schema.

In some embodiments, or in combination with any of the previous embodiments, the user API format comprises a data serialization format such as a JavaScript Object Notation (JSON) format or an Extensible Markup Language (XML) format.

In some embodiments, or in combination with any of the previous embodiments, the system is configured to: receive a connection request for establishing an operative communication channel with the user device; identify a Gateway Proxy associated with the connection request; determine whether a Client Certificate associated with the Gateway Proxy is verified by mutual authentication. Moreover, based on determining that the Client Certificate associated with the Gateway Proxy is verified by mutual authentication the system is structured to: establish a secure operative communication channel with the user device; receive the retrieval request for retrieving one or more records from the user device via the operative communication channel; and authorize the retrieval request for retrieving one or more records.

In some embodiments, or in combination with any of the previous embodiments, the first API is structured for retrieving a global number of data elements stored at the first database location, wherein the global number of data elements comprises the first data element associated with the retrieval request, and a third data element not associated with the retrieval request.

In some embodiments, or in combination with any of the previous embodiments, the user API format of the user device application is associated with XML attributes format, wherein transforming the first unstructured data and the second unstructured data such that the one or more structured records are associated with the user API format further comprises: transforming the first unstructured data and the second unstructured data into XML element format; and transforming the first unstructured data and the second unstructured data in the XML element format into an XML attribute format.

BRIEF DESCRIPTION OF THE DRAWINGS

Figure 1:
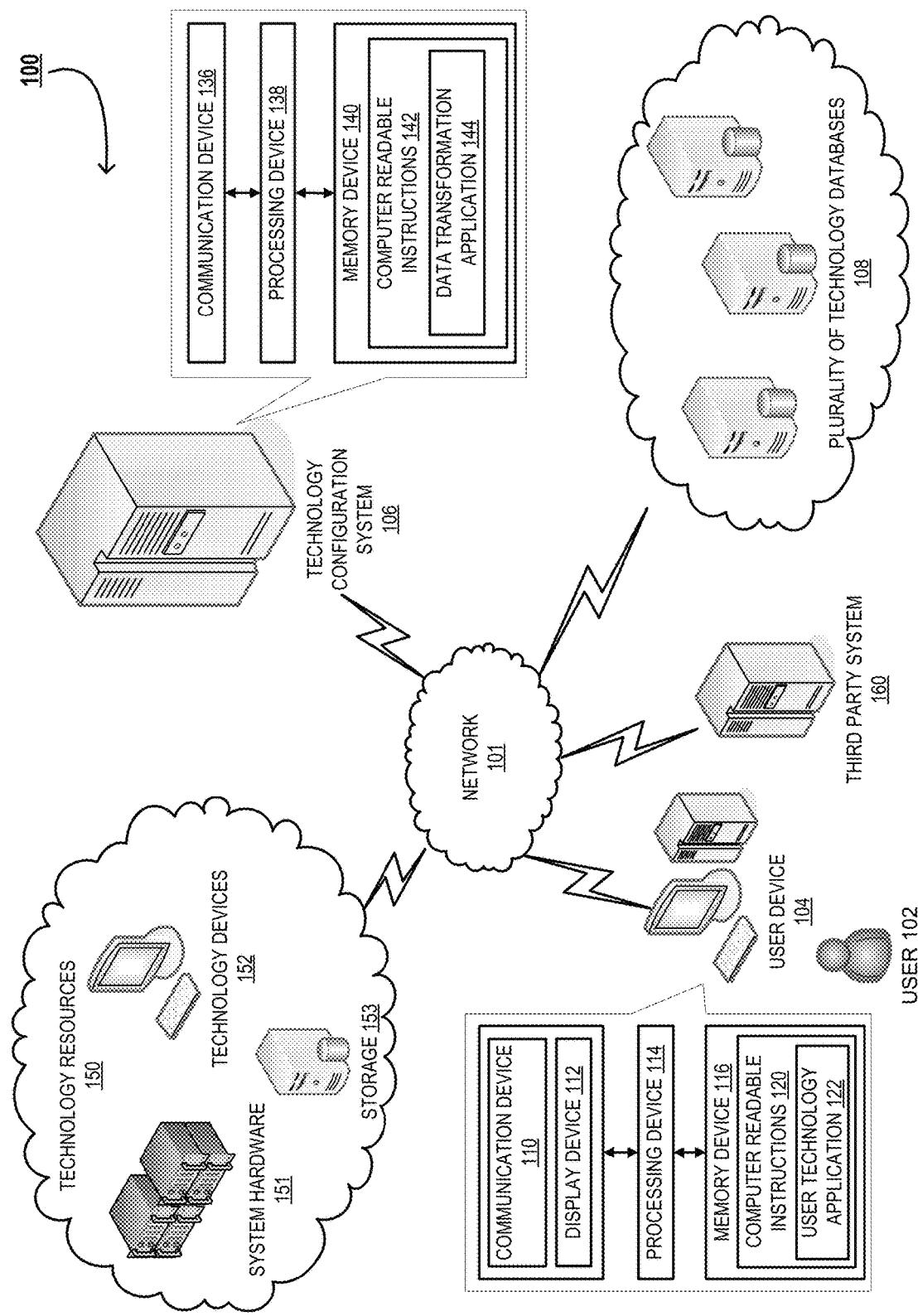
Figure 2:
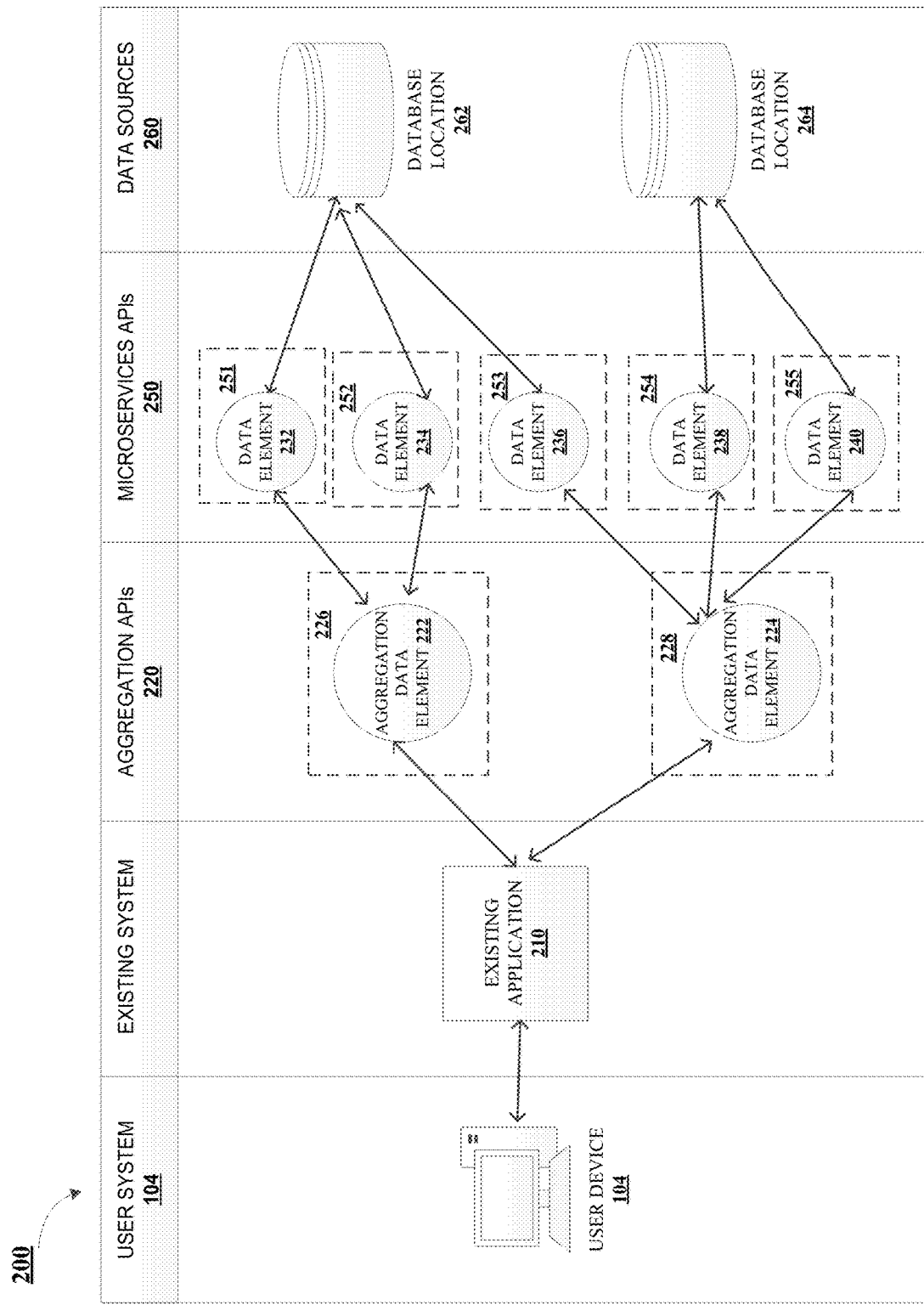
Figure 3:
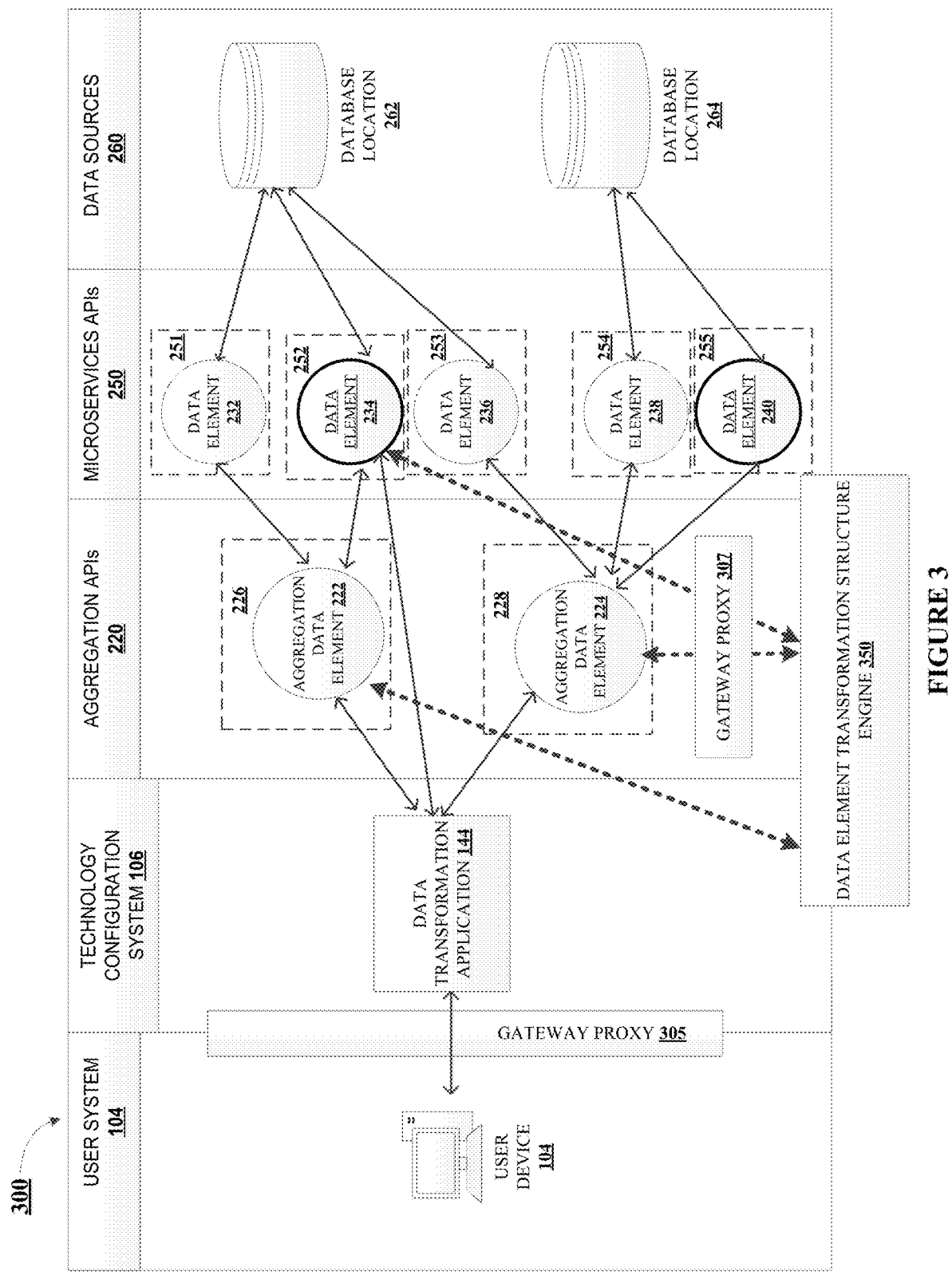
Figure 4:
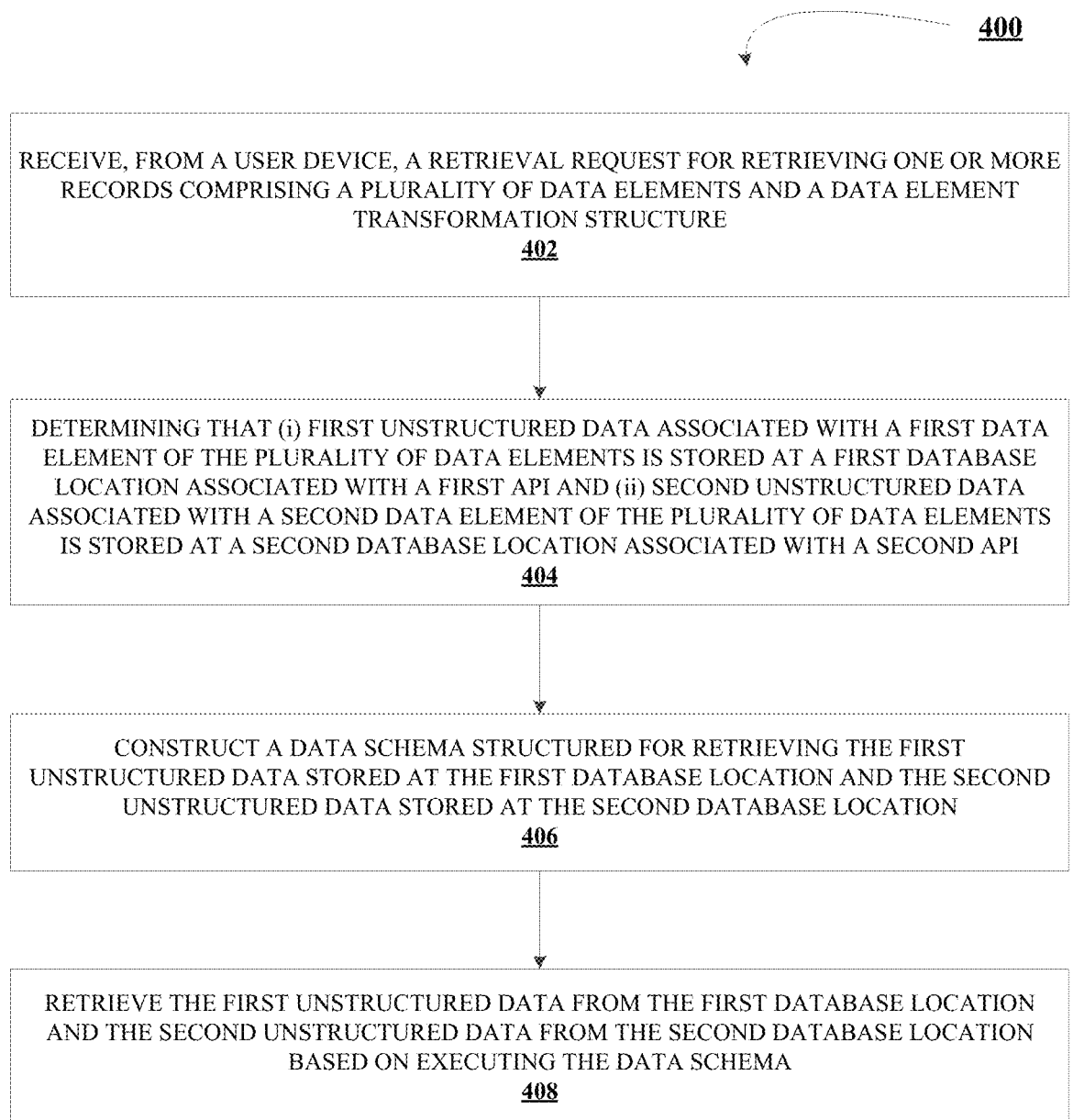
Figure 5:
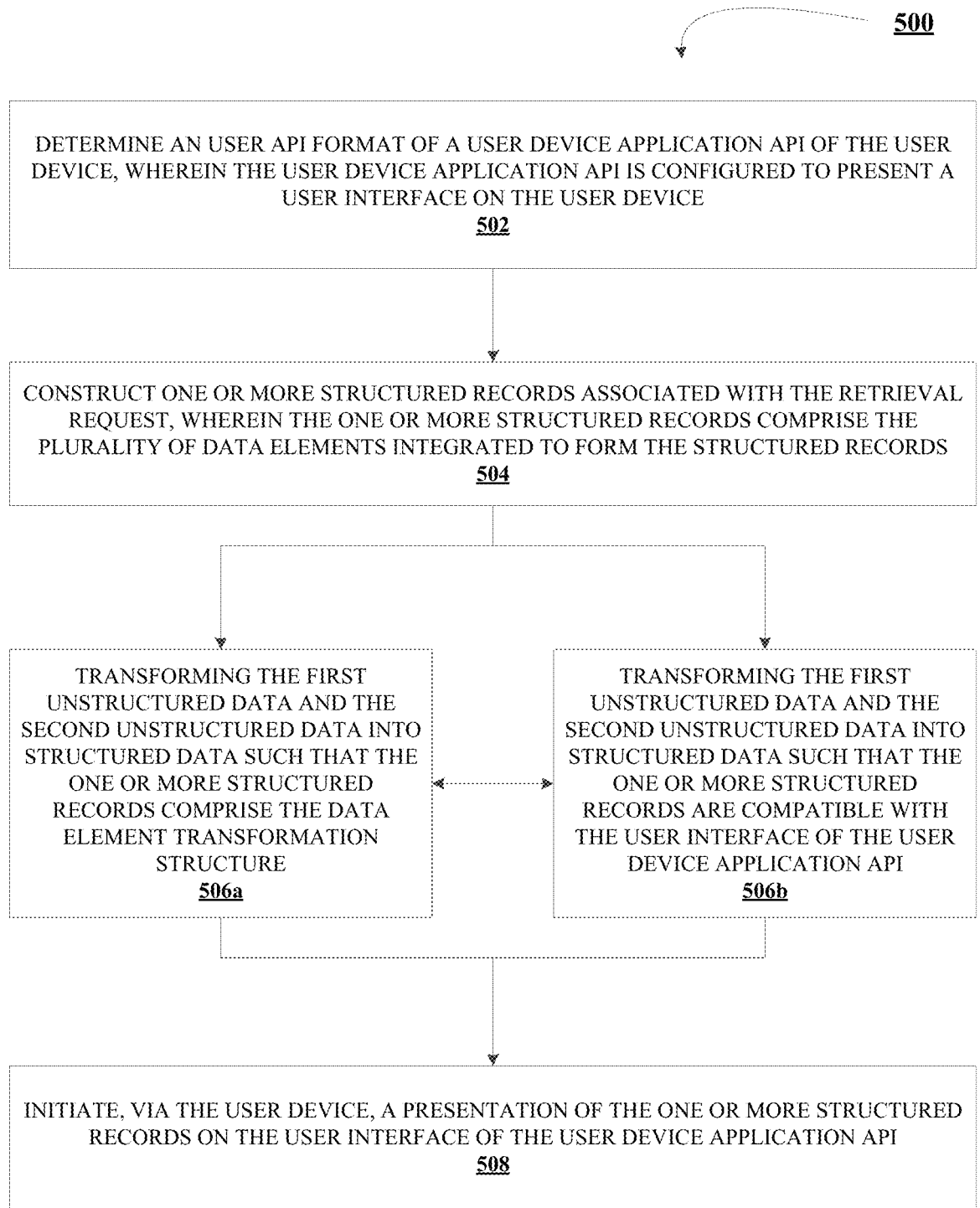
Figure 6:
Figure 7:
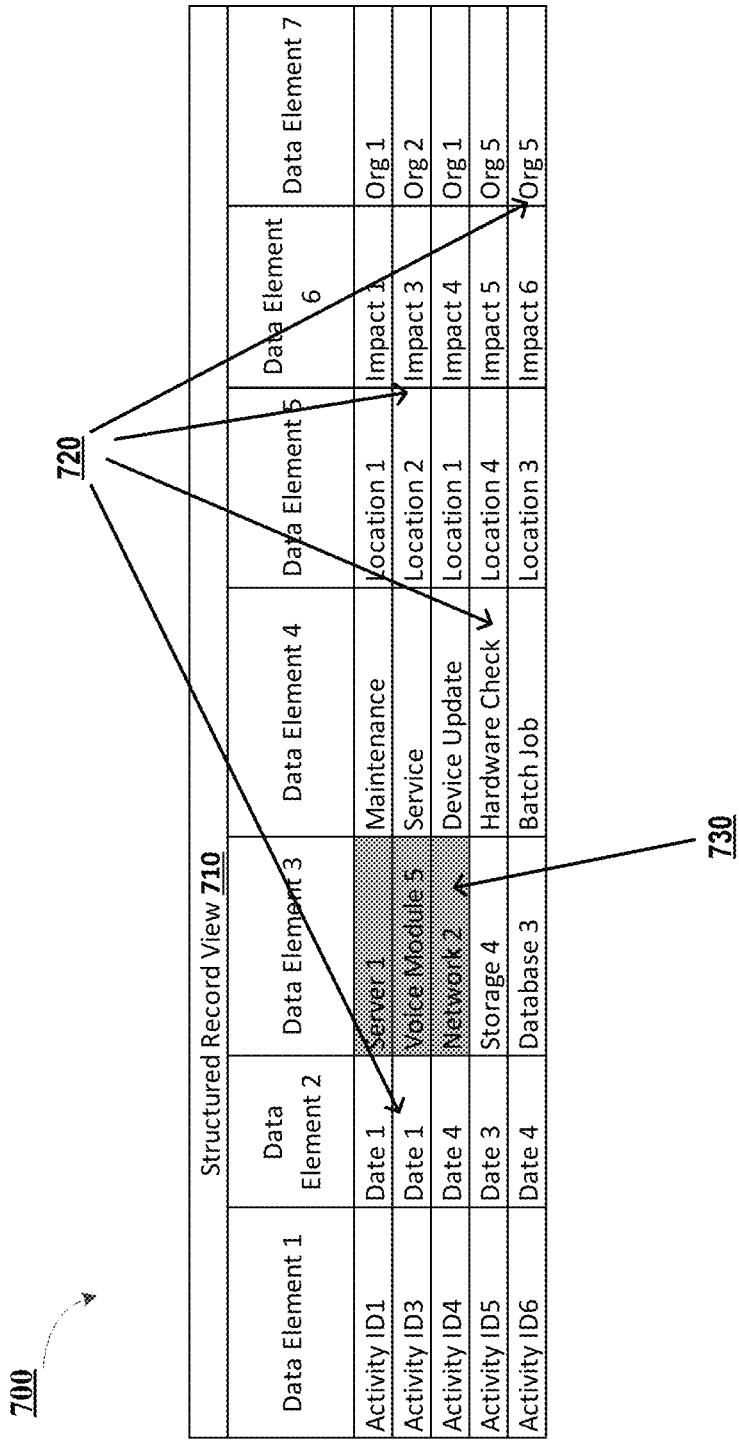

Having thus described embodiments of the invention in general terms, reference will be made to the accompanying drawings, where:

FIG. 1 illustrates a block diagram of the system environment 100 for dynamic network database integration, in accordance with some embodiments of the invention;

FIG. 2 illustrates a high level process flow 200 for data retrieval by an existing application;

FIG. 3 illustrates a high level process flow 300 for dynamic data retrieval dynamic network database integration, in accordance with some embodiments of the invention;

FIG. 4 illustrates a high level process flow 400 for systematic and dynamic data correlation and retrieval, in accordance with some embodiments of the invention;

FIG. 5 illustrates a high level process flow 500 for dynamic data transformation and integration, in accordance with some embodiments of the invention;

FIG. 6 illustrates a logical abstraction model 600, in accordance with some embodiments of the invention; and FIG. 7 illustrates a graphical user interface 700 including a representation of one or more structured records.

DETAILED DESCRIPTION OF THE INVENTION

Embodiments of the present invention may now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "user" may be an individual associated with an enterprise or entity. In some embodiments, a "user" may be an employee (e.g., an associate, a project manager, an IT specialist, a manager, an administrator, an internal operations analyst, or the like) of the entity or enterprises affiliated with the entity, capable of operating the system described herein. In some embodiments, a "user" may be any individual or entity who has a relationship with the enterprise. For purposes of this invention, the terms "user" and "customer" may be used interchangeably. In some embodiments, a "user" may be a customer of the enterprise. In one aspect, a user may be a system performing one or more tasks described herein.

In some embodiments, an "entity" or "enterprise" as used herein may be any institution employing information technology resources. In some embodiments the enterprise may be any institution, group, association, business, financial institution, club, establishment, company, union, authority or the like, employing information technology resources.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. In some embodiments, the graphical user interface may include both graphical elements and text elements.

Typically, an entity or enterprise is associated with a plurality of information technology operational activities. The "information technology operational activities," as referred to herein, may comprise any activities, operations, transactions, technology change activities, technology incidents, actions and events associated with day-to-day functioning of an entity, operations and control activities of technology resources of the entity, external networks of the entity, activities performed/initiated by employees, affiliates and customers of the entity, and the like. In some embodiments, the information technology operational activities may comprise operational activities associated with system hardware, operating systems, servers, technology applications, internal networks, storage/databases, user interfaces, authentication operations, middleware, software program products, external networks, software applications, hosting/facilities, business/technology processes, electrical infrastructure, and other technology resources or technology assets associated with the entity. In some embodiments, the information technology operational activities may be associated with transactional activities of the enterprise, comprising technology changes, technology events, technology maintenance activities, technology incidents, technology problems, technology releases, technology service requests, technology projects, configuration activities, technology resource/asset management activities, vendor transactions and the like. In some embodiments, the plurality of information technology operational activities may comprise technology change events/activities and technology incidents. As used herein, the term "event" relates to a discrete modification, addition, or deletion of a business asset, system, process, product, or the like. Exemplary events may include installing new hardware in an existing entity system, updating software used by the entity, implementing a procedural change to a business process, rolling out a new product or service, or updating the entity's website. As used herein, the term "change" relates to any program, project, or event related to the modification, addition, deletion of one or more business assets, systems, processes, products, or the like. The term "technology change" refers to any technology related change. The technology involved in a technology change may include computer hardware or software. In some embodiments, the information technology operational activities may be associated with financial activities such as activities associated with loan purchases, insurance purchases, mortgages, and/or other financial products.

In general, each operational activity of the plurality of activities, is associated with one or more data elements comprising data/information regarding the activity. These data elements may be directed to describing, recording, identifying and/or documenting the activity. In some instances, each of the plurality of data elements may comprise data associated with one or more aspects of the information technology operational activity, comprising but not limited to, technology resources/infrastructure involved, activity target, time, location, applications involved, type of activity, person/system that initiated/performed the activity, financial activities, user information, and/or other aspects. Furthermore, the data elements may by discrete components of unstructured data associated with the activity. The unstructured data associated with the data elements may comprise descriptive data, textual data, unformatted data, formatted data, or any other available forms of data/information or a combination of forms. The unstructured data associated with the data elements may be transformed, formatted, encoded, decoded, or otherwise fundamentally altered for constructing records associated with the activity, as will be described in detail later on.

The present invention is structured to construct a customized record for the user by integrating specific/selected data elements of the one or more data element, for each operational activity of a plurality of operational activities. Although referred to as "a record", it is understood that, in some embodiments the present invention may construct multiple records for each information technology operational activity. For example, the invention may construct a record comprise a sentence or phrase describing the activity. Here, the system may construct the record by correlating, transforming and subsequently integrating unstructured data (e.g., one or more words/phrases, alphanumeric characters, etc.) associated with individual/disparate data elements. As another example, system may construct the record in the form of a data object comprising discrete elements, for example, a row of a spreadsheet comprising information (e.g., transformed unstructured data) associated with various data elements in various columns and/or a data object/class comprising variables directed to specific data elements.

FIG. 1 illustrates a technology configuration system environment 100 for dynamic network database integration, in accordance with one embodiment of the present invention. As illustrated in FIG. 1, the technology configuration system 106 is operatively coupled, via a network 101 to technology resources 150, a plurality of technology databases 108, the user system/device 104, and to the third party system 160. The system environment 100 is described in detail, elsewhere in this disclosure.

In some embodiments, the data (e.g., unstructured data) associated with the operational activities, may be generated by the technology configuration system 106, by technology resources 150, and/or other external or third party systems 160. For example, the technology devices 152 (or the system 106 or the third party system) may establish operative communication channels with the technology resources 150 such as the system hardware 151 and/or storage 153, via the network 101. The technology devices 152 may identify an operational activity associated with a first resource (e.g., physical resources such as technology resources 150, financial resources such as accounts, insurance products, loan products etc.) and store unstructured data associated with the activity at a first data base location (e.g., the storage 153, a first database of the plurality of databases 108, or database location 262 illustrated in FIGS. 2 and 3), including unstructured data associated with one or more data elements such as data identifying the first resource (e.g., device identifier, financial resource identifier, resource type information, etc.), time stamp of the activity, user information, and/or the like. Continuing with the example, the third party system 160 may store other unstructured data associated with other data elements of the operational activity, for example, location of the first resource, applications associated with the resource, products associated with the activity, user actions associated with the activity (e.g., payment information, payment schedules, etc.), current activity status, subsequent actions, and/or the like. The third party system 106 may then store this additional unstructured data associated with the activity at a second data base location (e.g., a second database of the plurality of databases 108, or database location 264 illustrated in FIGS. 2 and 3). As will be described in detail with respect to FIGS. 2 and 3, a user system may seek to construct a record for the operational activity having data associated with one or more specific data elements. Here, the data elements required and a data element transformation structure for integrating the disparate data elements may be provided by users 102 using the user device 104. As described previously, the user 102 may refer to employees, technical subject matter experts, operators and other personnel associated with the entity or affiliates of the entity. As an illustration, a user 102 may review the constructed record (e.g., at or after blocks 504-508 of FIG. 5) associated with the operational activity such as an application updates (activity) initiated by the technology resources 150, a financial activity associated with a customer of the entity, etc., based on satisfying requisite authentication/authorization requirements.

Often, the unstructured data described above regarding the data elements of a plurality of activities constructed by various systems and stored in disparate, disconnected locations, comprise, incompatible/inconsistent technical languages, incompatible/inconsistent storage method/objects and/or formatting, inconsistent/erroneous data, incomplete data, other data defects, and/or the like. This unstructured data may also lack complete information about the activity, or are deficient in data describing specific aspects of the activity required by the user device, since this information may be stored as unstructured data in another disparate data location. Typically, these records include descriptive data with words, numbers, phrases and/or sentences about the activity. However, the unstructured data provided by the systems, that is stored in various locations, often includes technical terms, syntax, abbreviations, acronyms and terminology that is unique to the system creating/storing the data. Furthermore, the format, construction and context of the information in the record may be unique to the system/user that provided it, and therefore not comprehensible by other systems and not easily compatible for integration with other unstructured data associated with the same activity that was created by a different system and/or stored at another location. For example, an activity record may be entered by a system stating "Maintenance 3DNS". As another example, another record may read, "Alert fired 2200 EST. Checked web service from 2100 to 2300." Conventional systems are inept at evaluating such disparate information, much less correlating unstructured data for constructing each record, determining relationships between the data elements and fundamentally transforming and integrating the unstructured data to construct the records. The present invention provides a novel system 106 that is configured to perform systematic data processing, decipher technical terminology, correct data defects and further configured to perform dynamic correlation, transformation and combination/integration of data stored at a plurality of database locations, which alleviates the above concerns. These processes are described in detail throughout this disclosure.

FIG. 1 illustrates a technology configuration system environment 100, in accordance with one embodiment of the present invention, configured for dynamic correlation, transformation and combination of data stored at a plurality of database locations. As illustrated in FIG. 1, the technology configuration system 106 is operatively coupled, via a network 101 to technology resources 150, a plurality of technology databases 108, the user system/device 104, and to the third party system 160. In this way, the technology configuration system 106 can send information to, and receive information from the technology resources 150, the plurality of technology databases 108, the user system 104 and the third party system 160 to provide dynamic network database integration. FIG. 1 illustrates only one example of an embodiment of the technology configuration system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the technology configuration system 106 through an interface comprising a webpage or a user technology application 122 (e.g., an application configured for presenting the user interface associated with a user device application API). Hereinafter, "user technology application" is used to refer to an application on the user system 104 of a user, a widget, a webpage accessed through a browser, and the like. In some embodiments the user technology application 122 is a user system application stored on the user system 104. In some embodiments the user technology application may refer to a third party application or a user application stored on a cloud used to access the technology configuration system through a network. In some embodiments, at least a portion of the user technology application 122 is stored on the memory device 140 of the technology configuration system 106. The user 102 may subsequently navigate through the interface, retrieve one or more activity records, provide confirmation, or review presented information using a user system 104.

FIG. 1 also illustrates the user system 104. The user system 104 generally comprises a communication device 110, a display device 112, a processing device 114, and a memory device 116. The user system 104 is a computing system that allows a user 102 to interact with the technology configuration system to configure, monitor or control information technology operational activities of the entity. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the technology configuration system 106. As such, the communication device 110 generally comprises a modem, server, or other device for communicating with other systems/devices on the network 101. In some embodiments the network 101 comprises a network of distributed servers.

The user system 104 comprises computer-readable instructions 120 stored in the memory device 116/data storage, which in one embodiment includes the computer-readable instructions 120 of the user technology application 122. In this way, a user 102 may remotely communicate with the technology configuration system, view retrieved data and visual displays, and/or modify the data retrieval/integration operations during run-time via custom headers or attachments, such as a HTTP header. The user system 104 may be, for example, a computing system, a desktop personal computer, a server system, a mobile system, such as a cellular phone, smart phone, personal data assistant (PDA), laptop, or the like. Although only a single user system 104 is depicted in FIG. 1, the system environment 100 may contain numerous user systems 104. As further illustrated in FIG. 1, the technology configuration system 106 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the plurality of technology databases 108, the third party system 160 and the user system 104. As such, the communication device 136 generally comprises a modem, server, or other device for communicating with other devices on the network 101.

As further illustrated in FIG. 1, the technology configuration system 106 comprises computer-readable instructions 142 stored in the memory device 140, which in one embodiment includes the computer-readable instructions 142 of a data transformation application 144 configured for dynamic network database integration. The technology configuration system 106 may further comprise computer-readable instructions 142 for a data transformation application 144 configured for dynamic correlation, transformation and combination of data stored at a plurality of database locations.

As further illustrated by FIG. 1, the system environment 100 further comprises a plurality of technology databases 108. The plurality of technology databases 108 may be directed to memory storage technology resources, memory locations or data storages comprising an activity databases, data quality databases, cloud storage, and the like, as will be described in detail elsewhere in this disclosure. In some embodiments, the "technology databases" or "database locations" may comprise data sources, storage interfaces, systems and/or the like that are associated with data records, collections or records, and/or other data/information or one or more software types, interfaces and/or data formats.

The system environment 100 further comprises technology resources 150 comprising system hardware 151, technology devices and applications 152, operating systems, servers, technology applications, internal networks, storage/databases 153, user interfaces, authentication operations, middleware, program products, external networks, hosting/facilities, business/technology processes, and other technology resources or technology assets associated with the entity. In some embodiments, the technology configuration system 106 communicates with the individual technology resources 150, via established operative communication channels. In this regard, the system 106 may transmit control instructions that cause the technology resources 150 or the databases 108 to perform one or more actions, provide activity data, and the like. The technology resources 150 are typically configured to communicate with one another, other devices operated by the entity, and devices operated by third parties (e.g., customers), such as a third party computing device 160, via a network 101.

FIG. 2 illustrates a high level process flow 200 for data retrieval by an existing application 210 in accordance with conventional systems. As discussed previously unstructured data associated with a plurality of operational activities may be stored at various data sources 260 such as, but not limited to, a database location 262 and a database location 264. For example, database location 262 may store unstructured data associated with a predetermined number of activities. For each activity of the predetermined number of activities, the database location 262 may comprise unstructured data associated with data element 232, data element 234 and data element 236. Similarly, additional unstructured data associated with the predetermined number of activities may be stored at database location 264. For each activity of the predetermined number of activities, the database location 264 may comprise unstructured data associated with data element 238 and data element 240. As illustrated the network may comprise one or more preconfigured microservices application programming interfaces (APIs) 250 for retrieving each of these data elements from their respective storage locations. For instance, the network may comprise microservices API 251 associated with data element 232, microservices API 252 associated with data element 234, microservices API 253 associated with data element 236, microservices API 254 associated with data element 238, and microservices API 255 associated with data element 240. Moreover, the network may comprise preconfigured aggregation APIs 220 for aggregating the data associated with the data elements. For instance, aggregation API 226 may be configured to retrieve data associated with data elements 232 and 234 from microservices APIs 251 and 252, respectively, and transmit the same to the existing application 210 in the form or aggregation data element 222. For instance, aggregation API 228 may be configured to retrieve data associated with data elements 236, 238 and 240 from microservices APIs 253, 254 and 255, respectively, and transmit the same to the existing application 210 in the form or aggregation data element 224.

A user device 104 may request from the exiting application 210, data associated with data elements of a plurality of activities, such as, in the form of records. The existing application 210 may then retrieve the unstructured data associated with all of the data elements 232 and 234 from aggregation API 226 and the unstructured data associated with all of the data elements 236, 238 and 240 from aggregation API 228. The existing application 210 and the preconfigured APIs 220 are only configured to retrieve a global data set, i.e., data from all of the connected microservices. For instance, even if the user device 104 only requests data associated with data element 240, the preconfigured aggregation API 228 would return data associated with all of the data elements 236, 238 and 240, inundating the memory and processing components of both the existing application 210 and user device 104 with large volumes of unwanted data that was not requested and hence slowing down the processing speeds. Moreover, the existing application is not configured for determining whether the user device 104 is authorized to receive the unwanted data, thereby exacerbating security concerns. Although a few data elements are shown here for illustration purposes, an entity or enterprise is typically associated with a large number of activities, for example, hundreds, thousands or millions of information technology operational activities performed and stored across the entity network by various systems, with each activity having unstructured data associated with a large number of data elements. Because, the existing systems are only configured to transmit a global data set for each request from the user device 104, even the unstructured data associated with these large number of data elements that were not requested, which constitute massive amounts of data that, are required to be stored, correlated, and processed, placing strains on the technology resources available to the entity. Storing this data requires enormous memory capacity and processing of the records requires large processing power. Moreover, the existing application 210 is not capable of structural transformation of unstructured data based on custom user requests. The present invention offers an improvement to the foregoing existing technology by providing unique custom data retrieval, dynamic correlation, transformation and combination of data stored at a plurality of database locations, and run-time modification of data retrieval operations, as described in detail below with respect to FIGS. 3-7, and with respect to FIG. 3 in particular.

FIG. 3 illustrates a high level process flow 300 for dynamic data retrieval dynamic network database integration, in accordance with some embodiments of the invention, which alleviates the deficiencies of and provides improvements to the technology of conventional systems described with respect to FIG. 2. As discussed previously with respect to FIG. 2, unstructured data associated with a plurality of operational activities may be stored at various data sources 260 such as, but not limited to, a database location 262 and a database location 264. For example, for each activity of the predetermined number of activities, the database location 262 may comprise unstructured data associated with data element 232, data element 234 and data element 236. Similarly, for each activity of the predetermined number of activities, the database location 264 may comprise additional unstructured data associated with data element 238 and data element 240. As illustrated the network may comprise one or more preconfigured microservices application programming interfaces (APIs) 250 (251-255) for retrieving each of these data elements from their respective storage locations. For instance, the network may comprise microservices API 251 associated with data element 232, microservices API 252 associated with data element 234, microservices API 253 associated with data element 236, microservices API 254 associated with data element 238, and microservices API 255 associated with data element 240. Moreover, the network may comprise preconfigured aggregation APIs 220 for aggregating the data associated with the data elements. For instance, aggregation API 226 may be configured to retrieve data associated with data elements 232 and 234 from microservices APIs 251 and 252, respectively, and transmit the same to the existing application 210 in the form or aggregation data element 222. For instance, aggregation API 228 may be configured to retrieve data associated with data elements 236, 238 and 240 from microservices APIs 253, 254 and 255, respectively, and transmit the same to the existing application 210 in the form or aggregation data element 224.

The user device 104 may request from the data transformation application 144 of the technology configuration system 106, records having custom data elements of 234 and 240 only, with the records and the associated data being structured in a specified manner and in a manner compatible with an API of the user device application 122. For instance, the system 106 receive, from the user device 104, a retrieval request for retrieving one or more records. The request may comprise a desired data element transformation structure having specific desired configuration and attributes of the records for integrating/transforming the plurality of data elements (e.g., data elements 234 and 240) for each of the one or more records. The system may provide a convenient interface on the user device 104, for the user to provide the rule associated with the desired data element transformation structure. The system may then store these rules in a data element transformation structure engine 350. The system 106 may then determine that first unstructured data associated with the first data element 234 is stored at a first database location 262 and is associated with a microservices API 252, and that second unstructured data associated with the second data element 240 is stored at a second database location 264 and is associated with a microservices API 255.

The system may then construct a custom data schema (e.g., an XML, schema) structured for selectively retrieving the first unstructured data of the data element 234 stored at the first database location 262 and the second unstructured data of the data element 240 stored at the second database location 264. The system may then deploy the data schema, via the aggregation APIs 220 and the microservices APIs 252 and 255 to retrieve the first unstructured data from the first database location 262 and the second unstructured data from the second database location 264, without retrieving unrequested data. In some embodiments, the deploying the data schema causes modification of the code of the aggregations APIs and hence their functioning, such that only desired microservices APIs are invoked, without invoking all associated microservices APIs. In some embodiments, the deploying the data schema establishing operative connections with and interfacing with the desired microservices APIs directly (e.g., API 252). The system 106 may then construct one or more structured records comprising only the data elements 234 and 240. Typically, this involves transforming the first unstructured data and the second unstructured data into structured data such that at least (i) the one or more structured records comprise the data element transformation structure specified by the user, via the engine 350 (as indicated by dashed arrows), and (ii) the one or more structured records are associated with a user API format such that the one or more structured records are compatible with a user interface of the user device 104 application API, which would not be typically possible in the absence of the present invention. The system 106 may then transmit and initiate a presentation of the one or more structured records on the user interface of the user device 104 such that the records which are not otherwise compatible with the user interface, are now compatible for presentation.

The present invention may further provide increased security by implementing one or more authentication devices such as one or more gateway proxy devices (305, 307). For instance, for authenticating the user device 104, the system 106 may identify a Gateway Proxy 305 associated with the connection request and determine whether a Client Certificate associated with the Gateway Proxy 305 is verified by mutual authentication prior to performing further actions.

The various embodiments and associated steps relating to the dynamic network database integration performed by the invention are described in further detail below.

FIG. 4 illustrates a high level process flow 400 for systematic and dynamic data correlation and retrieval, in accordance with some embodiments of the invention. Some or all of the steps associated with the process flow 400 may be performed by the system 106, either alone or in combination with the technology resources 150, plurality of technology databases 108, user device 104 and other devices/systems. As discussed, the system 106 comprises a data transformation application 144, stored in at least one memory device 140, configured for dynamic correlation, transformation and combination of data stored at a plurality of database locations. In some embodiments, the system 106 comprises at least one processor 138 configured to execute computer readable instructions associated with the data transformation application 144, for one or more steps of process flow 400. Executing the instructions in the data transformation application 144 (and/or other modules within the technology configuration system 106) may cause the system 106, hereinafter referred to as "the system" to perform one or more steps described below with respect to process flow 400.

Block 402 of process flow 400, illustrates the system receiving a retrieval request for retrieving one or more records from the user device. Typically, the system receives a connection request from the user device for establishing an operative communication channel with the user device. In response, the system typically performs authentication, authorization and/or validation of the connection request. In some embodiments, the system may then identify a Gateway Proxy associated with the a connection request and further determine whether a Client Certificate associated with the Gateway Proxy is verified by mutual authentication. Based on determining that the Client Certificate associated with the Gateway Proxy is verified by mutual authentication, the system establish a secure operative communication channel with the user device and authorize the retrieval request for retrieving one or more records, thereby providing increased security for the data being transmitted/displayed.

As discussed, the system receive the retrieval request for retrieving one or more records from the user device via the operative communication channel. The retrieval request typically comprises a desired plurality of data elements to be integrated for each of the one or more records. Here, the system may present the available data elements to the user and receive a custom selection of the desired data elements. As such, the retrieval request specifies the custom data elements to be integrated to construct the records. Moreover, the retrieval request comprises a data element transformation structure comprising specific desired configuration and attributes for integrating the plurality of data elements for each of the one or more records and a desired data element transformation structure for integrating the plurality of data elements. The system may provide a convenient interface on the user device 104, for the user to provide the rules associated with the desired data element transformation structure. The data element transformation structure rules may comprise intra-record rules, comprising abstraction rules, such the desired levels of abstraction, classes of objects, etc., transformation rules, such as technical language/structure of the record/data elements, string concatenation of data elements, encoding/decoding of data elements, etc., formatting rules, such as, order of arrangement of the data elements, modification of characters (e.g., converting cases of certain characters), etc. and/or analysis rules such as computational functions, etc. to be applied to data elements of each of the records. The data element transformation structure rules may comprise inter-record rules, comprising selection rules for selecting a first subset of records for construction (e.g., based on determining that a user specified data element of the record matches a predetermined/user-specified value/format/structure), priority rules for assigning relative weights to each of the records, and/or the like. The interface may be structured such that the user is not required to be adept at technical programing languages for specifying the rules. The system may then store these rules in a data element transformation structure engine.

Next, at block 404, the system may determine the storage location for unstructured data associated with each of the plurality of data elements. The system may determine that first unstructured data associated with a first data element of the plurality of data elements is stored at a first database location associated with a first application programming interface (API) (e.g., a first microservices API and/or a first aggregation API). As discussed, the first API is typically structured for retrieving a global number of data elements stored at the first database location. For example, the API is typically structured for returning global number of data elements comprising the first data element associated with the retrieval request, along with one or more third data element not requested by the user device. Similarly, the system may determine that second unstructured data associated with a second data element of the plurality of data elements is stored at a second database location associated with a second API (e.g., a second microservices API and/or a second aggregation API).

Now referring to block 406 of process flow 400 illustrated in FIG. 4, the system may construct a data schema structured for retrieving the first unstructured data stored at the first database location and the second unstructured data stored at the second database location. The system may construct a custom data schema (e.g., an XML schema) structured for selectively retrieving the first unstructured data of the data element stored at the first database location and the second unstructured data of the data element stored at the second database location. The system may then deploy the data schema, via the APIs to retrieve the first unstructured data from the first database location and the second unstructured data from the second database location, without retrieving unrequested data. In some embodiments, the deploying the data schema causes modification of the code of the APIs and hence their functioning, such that only desired microservices APIs are invoked, without invoking all associated microservices APIs. In some embodiments, the deploying the data schema establishing operative connections with and interfacing with the desired microservices APIs directly. Subsequently, the system may retrieve the first unstructured data from the first database location and the second unstructured data from the second database location based on executing the data schema, at block 408. The system may store the retrieved unstructured data in temporary memory location either before, during or after the transformation steps 502-508 of process flow 500 described later on. The temporary memory location may refer to one or more of a dynamic RAM, a static RAM, cache memory, for faster memory, faster retrieval of data, reduction of processing power, memory requirement and processing time required for storage/retrieval of data, etc.

In some embodiments, the data schema is constructed such that the storage addresses of locations where the unstructured data of the data elements is stored, i.e., the first database location and the second database location, are referenced in the data schema by their associated APIs (e.g., a first microservices API and a second microservices API) and not the physical location address. In this manner, in some embodiments, even if the database locations of the storage change, the existing data schema having the associated microservices APIs can be employed to retrieve the data, without having to modify the schema. In the event that the new physical location of a particular unstructured data is not updated at the associated microservices API, the system may modify, once, the microservices API to reflect the updated data location, instead of updating every instance of the data element in the data schema. For instance, the system may determine that storage address of the first unstructured data has changed from the first database location to a third database location. Here, the system may update the first API such that the third database location is a source for the first API. Thereby, the data schema is structured for retrieving the first unstructured data stored at the third database location without having to modify the data schema. That said, in some embodiments, in the event that the new physical location of a particular unstructured data is associated with the new microservices API, the data schema can be easily updated to reflect the new API without having to enter the new physical location.

FIG. 5 illustrates a high level process flow 500 for dynamic data transformation and integration, in accordance with some embodiments of the invention. Some or all of the steps associated with the process flow 500 may be performed by the system 106, either alone or in combination with the technology resources 150, plurality of technology databases 108, user device 104 and other devices/systems, following the steps described with respect to process flow 400 of FIG. 4. Executing the instructions in the data transformation application 144 (and/or other modules within the technology configuration system 106) may cause the system 106, hereinafter referred to as "the system" to perform one or more steps described below with respect to process flow 500.

Flowing the implementation of the data schema at block 408 of process flow 400, at block 502 of process flow 500, the system may determine a user API format of a user device application API of the user device. As discussed, the user device application API is configured to present a user interface on the user device. In some instances, the unstructured data (e.g., the first unstructured data and the second unstructured data) is not compatible with the user interface of the user device application API in its existing state and may not meet the data element transformation structure specified by the user. In some embodiments, the user API format comprises a data serialization format. In some embodiments, the user API format comprises a data serialization format such as a JavaScript Object Notation (JSON) format, an Extensible Markup Language (XML) format or XML with HTTP format.

Next, at block 504, the system may construct one or more structured records associated with the retrieval request. Here, the system constructs the one or more structured records such that the records comprise structured data associated with only the plurality of data elements requested by the user device. Typically, constructing the one or more structured records comprises transforming the first unstructured data and the second unstructured data into structured data such that at least the one or more structured records comprise the data element transformation structure specified by the user, as indicated by block 560a. Here, the system transforms the records in accordance with the intra-record and the inter-record rules specified by the user system.

In some embodiments, transforming the first unstructured data and the second unstructured data into structured data comprises transforming the unstructured data into logical objects, based on the classes, relationships and the abstraction levels of the objects. Here, the system may determine a logical relationship between the first data element and the second data element based on analyzing the first data element and the second data element. The system may determine that the logical relationship of the first data element being a parent object to the and the second data element which is a child object. The system may similarly determine the logical relationships of the rest of the plurality of data elements. The system may then construct a logical data abstraction model based on the determined logical relationship. FIG. 6 illustrates a logical abstraction model 600, in accordance with some embodiments of the invention. As illustrated herein, the system constructs a logical code reflecting the determined logical relationships. For example, as reflected by the logical data abstraction model, the data element 1 has the first highest level of abstraction, with the data element 1 being the parent object to child object of data element 2 (reflecting a second level of abstraction, lower than the first level). Data element 2 may in turn represent a parent object for child objects of data elements 3.1-3.5 and 6, which represent a third level of abstraction, lower than the second level. Similarly, child objects associated with further lower level of abstractions associated with data elements 4.1-4.2, 7, 5.1-5.6 and 5.1-8.2 may be constructed. The system may then transform the first unstructured data and the second unstructured data based on the logical model by deploying/executing the associated code.

Now referring to FIG. 5, moreover, constructing the one or more structured records further comprises transforming the first unstructured data and the second unstructured data into structured data such that the one or more structured records are associated with the user API format, such that the one or more structured records are compatible with the user interface of the user device application API, as indicated by block 506b. In some embodiments, the user API format of the user device application is associated with XML attributes format. Here, in some instances, transforming the first unstructured data and the second unstructured data to be compatible with the user device comprises transforming the first unstructured data and the second unstructured data into XML element format and subsequently transforming the first unstructured data and the second unstructured data in the XML element format into an XML attribute format.

Subsequently, the system may initiate, via the user device, a presentation of the one or more structured records on the user interface of the user device application API, at block 508. FIG. 7 illustrates a graphical user interface 700 including a representation of one or more structured records. As illustrated by FIG. 7, the system may construct the records and present them in accordance with the logical model, the data element transformation structure and the user API format. The user interface may comprise presentation of a structured record view 710. The system may present the structured records for each of the operational activities ID1-ID6. For each record, the system may present the transformed, previously unstructured data 720 associated with the requested data elements 1-7. In some embodiments, the system presents an abstracted view such that one or more data elements associated with parent objects comprise a selectable graphical element 730. The selectable graphical element is structured such that selection of the selectable graphical element at the user device is configured to trigger the presentation of the associated child data elements.

Moreover, in some embodiments, the system is structured for facilitating modification the data retrieval/integration operations by the user, during run-time of the data retrieval and transformation operations of process flows 400 and 500 of FIGS. 4-5. For example, during the processing of the retrieval request, the user may determine that the user no longer requires a particular data element to be integrated into the requested records or that the user requires a different data element transformation structure. Instead of transmitting the constructed records in accordance with the prior retrieval request (that is no longer required), and requiring the user to transmit another new retrieval request, the system allows the user device to dynamically modify the existing retrieval request being processed, in run-time, using a custom HTTP header.

Here, the system may receive a modification request from the user device at a time following the retrieval request (block 402) and following the construction of the data schema (block 406) based on the prior retrieval request (and/or prior to the presentation at block 508 in some instances). Typically, the modification request comprises a modification to the plurality of data elements that are desired to be integrated into records (e.g., specification of abstraction levels of data elements, removal of certain data elements, etc.) and/or the data element transformation structure of the retrieval request rules. In response to the modification request, the system may then construct custom headers or attachments to send and receive metadata for dynamic correlation, transformation and combination of data. These custom headers or attachments (such as a custom Hypertext Transfer Protocol (HTTP) header) maybe structured for dynamically abstracting the presentation of the one or more structured records on the user interface in accordance with the modification request. In response to the modification request, the system may then construct a custom header structured for dynamically abstracting the presentation of the one or more structured records on the user interface in accordance with the modification request. The system may then dynamically modify and/or transform, at run time using the custom header, the one or more structured records based on the modification request to construct dynamically modified structured records, without requiring constructing of a modified data schema or another new schema, as will be described below. Typically, the custom header is structured for: (i) preventing/revoking the presentation of the one or more structured records on the user interface (e.g., at block 508) in accordance with the prior requires that is no longer required, and (ii) initiating a presentation of dynamically modified structured records, wherein the dynamically modified structured records comprise the one or more structured records modified based on the modification request.

In some embodiments, in response to the modification request, the system may then construct a custom Hypertext Transfer Protocol (HTTP) header structured for dynamically abstracting the presentation of the one or more structured records on the user interface in accordance with the modification request. The system may then dynamically modify and/or transform, at run time using the custom HTTP header, the one or more structured records based on the modification request to construct dynamically modified structured records, without requiring constructing of a modified data schema or another new schema, as will be described below. Typically, the custom HTTP header is structured for: (i) preventing/revoking the presentation of the one or more structured records on the user interface (e.g., at block 508) in accordance with the prior requires that is no longer required, and (ii) initiating a presentation of dynamically modified structured records, wherein the dynamically modified structured records comprise the one or more structured records modified based on the modification request. The custom headers or attachments are described herein with respect to a HTTP header, however, it is understood that other suitable header or attachment protocols/formats/types may be employed.

Moreover, in some instances, the system may identify that the one or more structured records (associated with the prior retrieval request) are being currently presented on the user interface (e.g., block 508). Here, the system may transmit control signals to the user device configured to block certain functionality of the presentation of the one or more structured records on the user interface. For example, the system may disable the selection features, disable scrolling, reduce the brightness of the display and/or of the current view, decrease the sharpness, turn a color display into a black and white display and/or the like. The system may then overlay a presentation of the dynamically modified structured records on the user interface over the presentation of the one or more structured records having blocked functionality.

Moreover, in some instances, the system may identify that the one or more structured records (associated with the prior retrieval request) are being currently presented on the user interface (e.g., block 508). Here, the system may revoke the presentation of the one or more structured records on the user interface. The system may then initiate a presentation of the dynamically modified structured records.

In some embodiments, the system may store the constructed one or more structured records associated with the retrieval request in a first temporary memory location, e.g., after blocks 506a-506b. In response to receiving the modification request, the system may then dynamically modify, at run time, using the custom HTTP header, the one or more structured records stored at the first temporary memory location based on the modification request, without constructing a modified data schema or presenting the one or more structured records (associated with the prior retrieval request). The system may then initiate a presentation of the dynamically modified structured records.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. In some embodiments, the data transformation application 144 may be referred to as a "module" stored in the at least one memory device 140, comprising computer readable instructions 142, that when executed by the at least one processor/processing device 138, cause the at least one processor to perform one or more steps described with respect to FIGS. 3-5. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F3.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computerized system for dynamic network database integration, wherein the computerized system is configured for dynamic correlation, transformation and combination of data stored at a plurality of database locations, comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
      receive, from a user device, a retrieval request for retrieving one or more records, wherein receiving the retrieval request comprises:
         receiving a plurality of data elements to be integrated for each of the one or more records; and receiving a data element transformation structure for integrating the plurality of data elements;

determine that (i) first unstructured data associated with a first data element of the plurality of data elements is stored at a first database location associated with a first application programming interface (API) and (ii) second unstructured data associated with a second data element of the plurality of data elements is stored at a second database location associated with a second API;

construct a data schema structured for retrieving the first unstructured data stored at the first database location and the second unstructured data stored at the second database location;

retrieve the first unstructured data from the first database location and the second unstructured data from the second database location based on executing the data schema;

determine a user API format of a user device application API of the user device, wherein the user device application API is configured to present a user interface on the user device, wherein the first unstructured data and the second unstructured data are not compatible with the user interface of the user device application API;

construct one or more structured records associated with the retrieval request, wherein the one or more structured records comprise the plurality of data elements, wherein constructing the one or more structured records comprises transforming the first unstructured data and the second unstructured data into structured data such that at least (i) the one or more structured records comprise the data element transformation structure and (ii) the one or more structured records are associated with the user API format such that the one or more structured records are compatible with the user interface of the user device application API; and initiate, via the user device, a presentation of the one or more structured records on the user interface of the user device application API.

2. The system of claim 1, wherein the processing device is further configured to execute the computer-readable program code to:

receive, from the user device, a modification request at a time following the retrieval request and following the construction of the data schema, wherein the modification request comprises a modification to at least one of the plurality of data elements and the data element transformation structure of the retrieval request; and in response to the modification request, construct a custom Hypertext Transfer Protocol (HTTP) header structured for dynamically abstracting the presentation of the one or more structured records on the user interface based on the modification request, wherein the custom HTTP header is structured for:

preventing the presentation of the one or more structured records on the user interface; and initiating a presentation of dynamically modified structured records, wherein the dynamically modified structured records comprise the one or more structured records modified based on the modification request.

3. The system of claim 2, wherein, in response to the modification request, the processing device is further configured to execute the computer-readable program code to:

identify that the one or more structured records are being currently presented on the user interface; and wherein preventing the presentation of the one or more structured records on the user interface further comprises blocking functionality of the presentation of the one or more structured records on the user interface; and wherein initiating the presentation of the dynamically modified structured records comprises overlaying the presentation of the dynamically modified structured records on the user interface over the presentation of the one or more structured records having blocked functionality.

4. The system of claim 2, wherein, in response to the modification request, the processing device is further configured to execute the computer-readable program code to:

identify that the one or more structured records are being currently presented on the user interface;

wherein, preventing the presentation of the one or more structured records on the user interface further comprises revoking the presentation of the one or more structured records on the user interface.

5. The system of claim 2, wherein the processing device is further configured to execute the computer-readable program code to:

store the constructed one or more structured records associated with the retrieval request in a first temporary memory location; and in response to the modification request, dynamically modify at run time, via the custom HTTP header, the one or more structured records stored at the first temporary memory location based on the modification request, without constructing a modified data schema.

6. The system of claim 1, wherein the processing device is further configured to execute the computer-readable program code to:

determine a logical relationship between the first data element and the second data element based on analyzing the first data element and the second data element, wherein the logical relationship comprises a parent object comprising the first data element and a child object comprising the second data element; and wherein constructing the one or more structured records associated with the retrieval request comprises:

constructing a logical data model based on the determined logical relationship; and transforming the first unstructured data and the second unstructured data based on the logical model.

7. The system of claim 6, wherein initiating the presentation of the one or more structured records on the user interface further comprises:

presenting, for each record of the one or more structured records, an abstracted view comprising a selectable graphical element associated with the first data element, wherein the selectable graphical element is structured such that selection of the selectable graphical element at the user device is configured to trigger the presentation of the second data element.

8. The system of claim 1, wherein the first API is a Microservices API associated with the first data element, wherein the processing device is further configured to execute the computer-readable program code to:

determine that storage address of the first unstructured data has changed from the first database location to a third database location; and update the first API such that the third database location is a source for the first API, wherein the data schema is structured for retrieving the first unstructured data stored at the third database location without modifying the data schema.

9. The system of claim 1, wherein the user API format comprises a data serialization format.

10. The system of claim 1, wherein the processing device is further configured to execute the computer-readable program code to:
receive a connection request for establishing an operative communication channel with the user device;
identify a Gateway Proxy associated with the connection request;
determine whether a Client Certificate associated with the Gateway Proxy is verified by mutual authentication; and
based on determining that the Client Certificate associated with the Gateway Proxy is verified by mutual authentication:
establish a secure operative communication channel with the user device;
receive the retrieval request for retrieving the one or more records from the user device via the secure operative communication channel; and
authorize the retrieval request for retrieving the one or more records.

11. The system of claim 1, wherein the first API is structured for retrieving a global number of data elements stored at the first database location, wherein the global number of data elements comprises the first data element associated with the retrieval request, and a third data element not associated with the retrieval request.

12. The system of claim 1, wherein the user API format of the user device application is associated with XML attributes format, wherein transforming the first unstructured data and the second unstructured data such that the one or more structured records are associated with the user API format further comprises:
transforming the first unstructured data and the second unstructured data into XML element format; and
transforming the first unstructured data and the second unstructured data in the XML element format into an XML attribute format.

13. A computer program product for dynamic network database integration, wherein the computer program product is configured for dynamic correlation, transformation and combination of data stored at a plurality of database locations, the computer program product comprising a non-transitory computer-readable storage medium having computer-executable instructions for causing a computer processor to:
receive, from a user device, a retrieval request for retrieving one or more records, wherein receiving the retrieval request comprises:
receiving a plurality of data elements to be integrated for each of the one or more records; and
receiving a data element transformation structure for integrating the plurality of data elements;
determine that (i) first unstructured data associated with a first data element of the plurality of data elements is stored at a first database location associated with a first application programming interface (API) and (ii) second unstructured data associated with a second data element of the plurality of data elements is stored at a second database location associated with a second API;
construct a data schema structured for retrieving the first unstructured data stored at the first database location and the second unstructured data stored at the second database location;
retrieve the first unstructured data from the first database location and the second unstructured data from the second database location based on executing the data schema;
determine a user API format of a user device application API of the user device, wherein the user device application API is configured to present a user interface on the user device, wherein the first unstructured data and the second unstructured data are not compatible with the user interface of the user device application API;
construct one or more structured records associated with the retrieval request, wherein the one or more structured records comprise the plurality of data elements, wherein constructing the one or more structured records comprises transforming the first unstructured data and the second unstructured data into structured data such that at least (i) the one or more structured records comprise the data element transformation structure and (ii) the one or more structured records are associated with the user API format such that the one or more structured records are compatible with the user interface of the user device application API; and
initiate, via the user device, a presentation of the one or more structured records on the user interface of the user device application API.

14. The computer program product of claim 13, wherein the non-transitory computer-readable storage medium further comprises computer-executable instructions for causing the computer processor to:
receive, from the user device, a modification request at a time following the retrieval request and following the construction of the data schema, wherein the modification request comprises a modification to at least one of the plurality of data elements and the data element transformation structure of the retrieval request; and
in response to the modification request, construct a custom Hypertext Transfer Protocol (HTTP) header structured for dynamically abstracting the presentation of the one or more structured records on the user interface based on the modification request, wherein the custom HTTP header is structured for:
preventing the presentation of the one or more structured records on the user interface; and
initiating a presentation of dynamically modified structured records, wherein the dynamically modified structured records comprise the one or more structured records modified based on the modification request.

15. The computer program product of claim 13, the non-transitory computer-readable storage medium further comprises computer-executable instructions for causing the computer processor to:
determine a logical relationship between the first data element and the second data element based on analyzing the first data element and the second data element, wherein the logical relationship comprises a parent object comprising the first data element and a child object comprising the second data element; and
wherein constructing the one or more structured records associated with the retrieval request comprises:
constructing a logical data model based on the determined logical relationship; and transforming the first unstructured data and the second unstructured data based on the logical model.

16. The computer program product of claim 13, the non-transitory computer-readable storage medium further comprises computer-executable instructions for causing the computer processor to:
   receive a connection request for establishing an operative communication channel with the user device;
   identify a Gateway Proxy associated with the connection request;
   determine whether a Client Certificate associated with the Gateway Proxy is verified by mutual authentication; and
   based on determining that the Client Certificate associated with the Gateway Proxy is verified by mutual authentication:
      establish a secure operative communication channel with the user device;
      receive the retrieval request for retrieving the one or more records from the user device via the secure operative communication channel; and
      authorize the retrieval request for retrieving the one or more records.

17. A method for dynamic network database integration, wherein the method is configured for dynamic correlation, transformation and combination of data stored at a plurality of database locations, the method comprising:
   receiving, from a user device, a retrieval request for retrieving one or more records, wherein receiving the retrieval request comprises:
      receiving a plurality of data elements to be integrated for each of the one or more records; and
      receiving a data element transformation structure for integrating the plurality of data elements;
   determining that (i) first unstructured data associated with a first data element of the plurality of data elements is stored at a first database location associated with a first application programming interface (API) and (ii) second unstructured data associated with a second data element of the plurality of data elements is stored at a second database location associated with a second API;
   constructing a data schema structured for retrieving the first unstructured data stored at the first database location and the second unstructured data stored at the second database location;
   retrieving the first unstructured data from the first database location and the second unstructured data from the second database location based on executing the data schema;
   determining a user API format of a user device application API of the user device, wherein the user device application API is configured to present a user interface on the user device, wherein the first unstructured data and the second unstructured data are not compatible with the user interface of the user device application API;
   constructing one or more structured records associated with the retrieval request, wherein the one or more structured records comprise the plurality of data elements, wherein constructing the one or more structured records comprises transforming the first unstructured data and the second unstructured data into structured data such that at least (i) the one or more structured records comprise the data element transformation structure and (ii) the one or more structured records are associated with the user API format such that the one or more structured records are compatible with the user interface of the user device application API; and
   initiating, via the user device, a presentation of the one or more structured records on the user interface of the user device application API.

18. The method of claim 17, wherein the method further comprises:
   receiving, from the user device, a modification request at a time following the retrieval request and following the construction of the data schema, wherein the modification request comprises a modification to at least one of the plurality of data elements and the data element transformation structure of the retrieval request; and
   in response to the modification request, constructing a custom Hypertext Transfer Protocol (HTTP) header structured for dynamically abstracting the presentation of the one or more structured records on the user interface based on the modification request, wherein the custom HTTP header is structured for:
      preventing the presentation of the one or more structured records on the user interface; and
      initiating a presentation of dynamically modified structured records, wherein the dynamically modified structured records comprise the one or more structured records modified based on the modification request.

19. The method of claim 17, wherein the method further comprises:
   determining a logical relationship between the first data element and the second data element based on analyzing the first data element and the second data element, wherein the logical relationship comprises a parent object comprising the first data element and a child object comprising the second data element; and
   wherein constructing the one or more structured records associated with the retrieval request comprises:
      constructing a logical data model based on the determined logical relationship; and
      transforming the first unstructured data and the second unstructured data based on the logical model.

20. The method of claim 17, wherein the method further comprises:
   receiving a connection request for establishing an operative communication channel with the user device;
   identifying a Gateway Proxy associated with the connection request;
   determining whether a Client Certificate associated with the Gateway Proxy is verified by mutual authentication; and
   based on determining that the Client Certificate associated with the Gateway Proxy is verified by mutual authentication:
      establishing a secure operative communication channel with the user device;
      receiving the retrieval request for retrieving the one or more records from the user device via the secure operative communication channel; and
      authorizing the retrieval request for retrieving the one or more records.

* * * * *